Feb. 16, 1954 P. L. TORRE 2,669,463
RESILIENT SUSPENSION SYSTEM FOR MOTORCYCLE WHEELS
Filed June 8, 1951 2 Sheets-Sheet 1

INVENTOR:
PIER LUIGI TORRE
By Attorneys
Young, Emery & Thompson

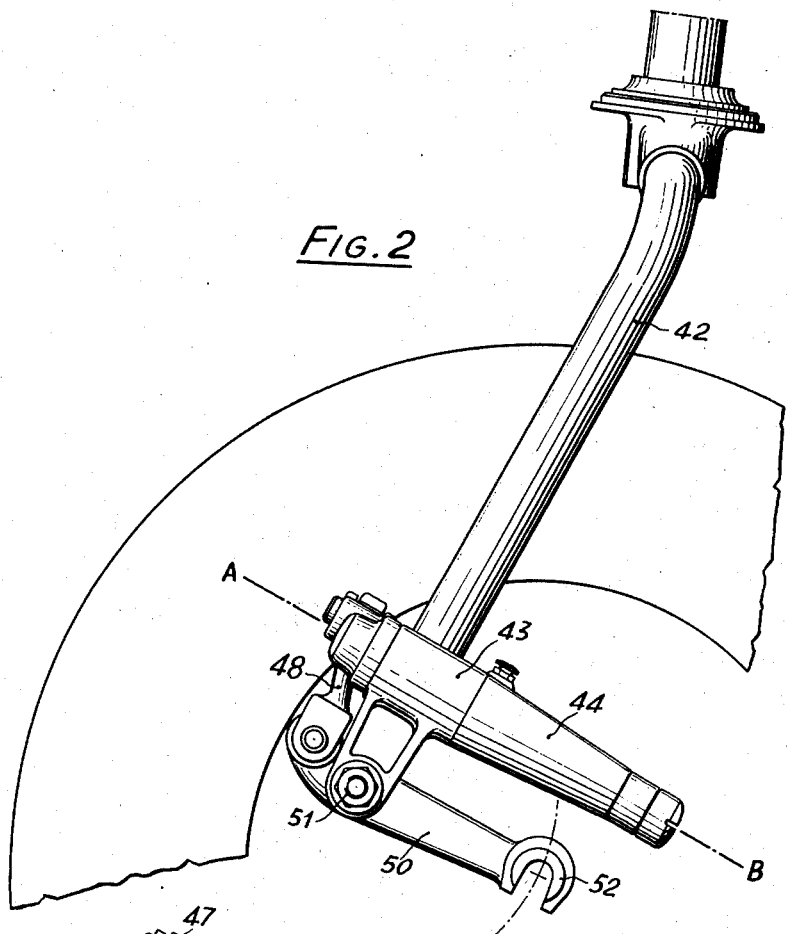
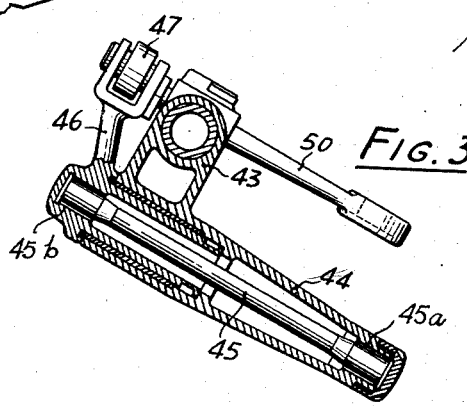

Patented Feb. 16, 1954

2,669,463

UNITED STATES PATENT OFFICE 2,669,463

RESILIENT SUSPENSION SYSTEM FOR MOTORCYCLE WHEELS

Pier Luigi Torre, Milan, Italy

Application June 8, 1951, Serial No. 230,603

Claims priority, application Italy June 14, 1950

2 Claims. (Cl. 280—277)

It is the object of the present invention to provide a system for the elastic suspension of motorcycle wheels making use of torsion bars, arranged in a simple way and such as to result in a compact design, in order to avoid dimensions that would not be permissible for the application on vehicles of this type.

More precisely, the resilient suspension system, according to the present invention, comprises torsion bars symmetrically positioned within supports assembled on the sides of the arms of the wheel supporting fork and fast to same. On the rear end of each support there is splined an end of the associated bar. The opposite ends of said bars are respectively rigidly locked to two transverse levers, swingable about journals provided on the front ends of said supports. These two levers are then linked, each by means of a vertical connecting rod with ball-and-socket joints with the front end of a rocking lever, pivoted on an associated fork arm, the other end of each rocking lever carrying the wheel spindle.

The accompanying drawing illustrates diagrammatically a way of practical embodiment of the invention, and namely:

Fig. 2 is a side view of the suspension in Fig. 1.

Fig. 3 is a section along line A—B in Fig. 2.

Figure 1:
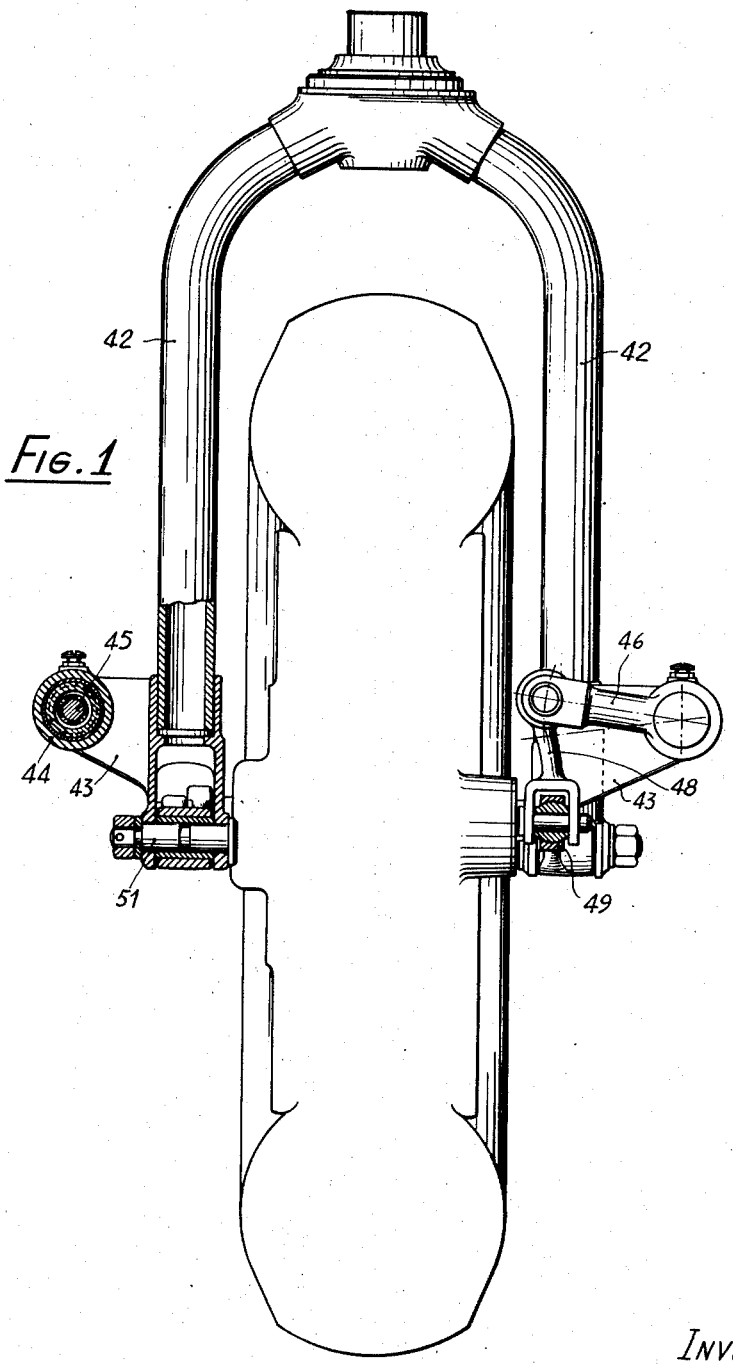
Fig. 1 is a front view, partially sectioned, of a suspension for the front wheel of a motorcycle, according to the invention.

As apparent from the drawings, on the lower portion of the arms 42, of the wheel supporting fork, there are symmetrically assembled the supports 43 from which protrude extensions 44, which cooperate with the supports to form housings concentrically in which are positioned the torsion bars 45. To the rear ends of the extensions 44 the rear ends of the bars 45 are fixed by splines 45a. The front ends of said bars are connected to the hub of the lever 46 by splines 45b. The hub of each lever is rotatably journaled on the front portion of each extension 44.

The lever 46 is connected at its end by a ball and socket joint 47 to a connecting rod 48. The lower end of the connecting rod 48 is connected by a ball and socket joint 49 to one end of the rocking lever 50, pivoted at 51, on a bracket of the support 43. The other end of the rocking lever 50 carries the seats 52 for the wheel spindle.

In the springing suspension operation, for each upward movement of the wheel spindle there corresponds a downward movement of the link 48, which is connected at its lower end with the rocking lever 50. This downward movement of the link 48 causes the lowering of the end of the lever 46 connected with the link 48. Consequently the torsion bar 45, connected with the lever 46, and rearwardly locked on the extension 44, is stressed with a twisting action, thus supplying the desired resilient suspension.

While I have shown and described particular structures, it is to be clearly understood that the same were merely for purpose of illustration, and that changes and modifications may readily be made therein by those skilled in the art, without departing from the spirit and scope of the appended claims.

What I claim is:

1. A resilient suspension system for the front wheel of a motorcycle, comprising, in combination with a wheel supporting fork, a housing placed on the side of the lower portion of each of the fork arms, and lying in a plane transverse to the axis of said arms, a torsion bar positioned inside each housing and splined at one end to the rear end of said housing, a lever connected fast at one end to the other end of each torsion bar, a link provided with ball-and-socket joints and connected to the other end of each lever, two rocking levers positioned in a plane perpendicular to those of the aforesaid levers, said rocking levers being pivoted on the ends of the fork arms and connected at one end to said links, and the other ends of said rocking levers being provided with means for receiving the wheel spindle.

2. A resilient suspension for the front wheel of a cycle comprising in combination with a wheel supporting fork, an elongated housing mounted on the outside lower portion of each arm of the fork, a torsion rod in each housing and positioned with its axis perpendicular to the arm of the fork on which the housing is mounted, a crank arm mounted for swinging movement in each housing with its swinging axis coinciding with the axis of the torsion rod mounted therein, means fixing one end of each torsion rod to its housing, means fixing each crank arm to the other end of its torsion rod, a rocking lever pivotally mounted intermediate its ends at the lower end of each fork arm with their pivotal axes aligned, means at one end of each rocking lever for supporting a wheel axle, and a link pivotally connecting the other end of the rocking lever to the free end of the crank arm carried by the housing on the corresponding arm of the fork.

PIER LUIGI TORRE.

References Cited in the file of this patent

UNITED STATES PATENTS

| Number | Name | Date |
|---|---|---|
| 1,396,549 | Beatty | Nov. 8, 1921 |
| 2,170,565 | Macbeth | Aug. 22, 1939 |
| 2,174,996 | Rabe | Oct. 3, 1939 |
| 2,401,869 | Halliday | June 11, 1946 |